US012512627B2

(12) United States Patent
Maesoba et al.

(10) Patent No.: US 12,512,627 B2
(45) Date of Patent: Dec. 30, 2025

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Osaka (JP); Toshifumi Ichio, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 338 days.

(21) Appl. No.: 18/024,762

(22) PCT Filed: Jul. 30, 2021

(86) PCT No.: PCT/JP2021/028376
§ 371 (c)(1),
(2) Date: Mar. 5, 2023

(87) PCT Pub. No.: WO2022/054455
PCT Pub. Date: Mar. 17, 2022

(65) Prior Publication Data

US 2023/0261422 A1 Aug. 17, 2023

(30) Foreign Application Priority Data

Sep. 14, 2020 (JP) ................................ 2020-153519

(51) Int. Cl.
*H01R 13/6581* (2011.01)
*H01R 13/516* (2006.01)

(52) U.S. Cl.
CPC ....... *H01R 13/6581* (2013.01); *H01R 13/516* (2013.01)

(58) Field of Classification Search
CPC .............. H01R 13/6581; H01R 13/516; H01R 13/4223; H01R 13/50; H01R 13/65915
See application file for complete search history.

(56) References Cited

U.S. PATENT DOCUMENTS 5,823,824 A 10/1998 Mitamura et al.
2004/0132341 A1 7/2004 Noguchi et al.
(Continued)

FOREIGN PATENT DOCUMENTS

JP H11-339870 A 12/1999
JP 2000-156261 A 6/2000
(Continued)

OTHER PUBLICATIONS

International Search Report issued on Oct. 5, 2021 for WO 2022/054455 A1 (4 pages).

*Primary Examiner* — Truc T Nguyen
(74) *Attorney, Agent, or Firm* — Venjuris, P.C.

(57) ABSTRACT

It is aimed to prevent the rattling of a shield terminal in a housing. A shield connector is provided with a shield terminal (20) configured such that an inner conductor (21) and a dielectric (23) are surrounded by an outer conductor (24), and a housing (10) for accommodating the shield terminal (20). The housing (10) includes a receptacle (16) for surrounding a front end part of the shield terminal (20) while being spaced apart therefrom. The housing (10) is formed with a tubular holding portion (18) for holding an outer peripheral part of the front end part of the shield terminal (20) in the receptacle (16).

8 Claims, 5 Drawing Sheets

(56) References Cited

U.S. PATENT DOCUMENTS

| | | | | |
|---|---|---|---|---|
| 2009/0258540 | A1* | 10/2009 | Kameyama | H01R 13/502 439/607.55 |
| 2013/0059472 | A1* | 3/2013 | Saito | H01R 13/648 439/607.27 |
| 2013/0288522 | A1* | 10/2013 | Ii | H01R 13/4223 439/607.01 |
| 2013/0288523 | A1* | 10/2013 | Ii | H01R 13/6581 439/607.01 |
| 2018/0006407 | A1* | 1/2018 | Sasaki | H01R 24/40 |
| 2018/0026408 | A1* | 1/2018 | Ensley | H01R 24/38 439/578 |
| 2018/0048108 | A1 | 2/2018 | Takahashi | |
| 2020/0274265 | A1* | 8/2020 | Hashimoto | H01R 13/6583 |
| 2022/0247133 | A1* | 8/2022 | Maesoba | H01R 9/05 |
| 2023/0042748 | A1* | 2/2023 | Maesoba | H01R 13/65912 |
| 2023/0062139 | A1* | 3/2023 | Maddens | H01R 13/533 |
| 2023/0261422 | A1* | 8/2023 | Maesoba | H01R 13/65915 439/607.01 |
| 2024/0322467 | A1* | 9/2024 | Suzuki | H01R 13/6582 |
| 2025/0158310 | A1* | 5/2025 | Kobayashi | H01R 13/516 |

FOREIGN PATENT DOCUMENTS

| | | | |
|---|---|---|---|
| JP | 2015-195148 | A | 11/2015 |
| JP | 2017-103089 | A | 6/2017 |

* cited by examiner

SHIELD CONNECTOR

CROSS REFERENCE TO RELATED APPLICATIONS

This application is a national phase of PCT application No. PCT/JP2021/028376, filed on 30 Jul. 2021, which claims priority from Japanese patent application No. 2020-153519, filed on 14 Sep. 2020, all of which are incorporated herein by reference.

TECHNICAL FIELD

The present disclosure relates to a shield connector.

BACKGROUND

Patent Document 1 discloses a shield connector including an electrical connection element formed by integrally assembling an outer conductor, a dielectric and an inner conductor, and a connector housing. The electrical connection element is accommodated in an accommodating portion of the connector housing. A space into which a tubular fitting portion of a mating connector is fit is secured between the outer peripheral surface of a front end part of the electrical connection element and the inner peripheral surface of a receptacle of the connector housing.

PRIOR ART DOCUMENT

Patent Document

Patent Document 1: JP H11-339870 A

SUMMARY OF THE INVENTION

Problem to be Solved

In an assembled part of the connector housing and the electrical connection element, it is unavoidable that a gap is formed within the range of dimensional tolerances. Thus, there is a concern that the front end part of the electrical connection element rattles in the receptacle and connection to the mating connector is hindered.

A shield connector of the present disclosure was completed on the basis of the above situation and aims to prevent the rattling of a shield terminal in a housing.

Means to Solve the Problem

The present disclosure is directed to a shield connector with a shield terminal configured such that an inner conductor and a dielectric are surrounded by an outer conductor, and a housing for accommodating the shield terminal, the housing including a receptacle for surrounding a front end part of the shield terminal while being spaced apart therefrom, and the housing being formed with a tubular holding portion for holding an outer peripheral part of the front end part of the shield terminal in the receptacle.

Effect of the Invention

According to the present disclosure, it is possible to prevent the rattling of a shield terminal in a housing.

DETAILED DESCRIPTION TO EXECUTE THE INVENTION

Description of Embodiments of Present Disclosure

First, embodiments of the present disclosure are listed and described.

(1) The shield connector of the present disclosure is provided with a shield terminal configured such that an inner conductor and a dielectric are surrounded by an outer conductor, and a housing for accommodating the shield terminal, the housing including a receptacle for surrounding a front end part of the shield terminal while being spaced apart therefrom, and the housing being formed with a tubular holding portion for holding an outer peripheral part of the front end part of the shield terminal in the receptacle. According to this configuration, since the tubular holding portion of the housing holds the front end part of the shield terminal, the rattling of the shield terminal in the housing can be prevented.

(2) Preferably, a terminal accommodating portion is formed behind the receptacle in the housing, the shield terminal includes a terminal body portion to be accommodated into the terminal accommodating portion, a width of the front end part of the shield terminal and that of the terminal body portion are equal, and a width of the tubular holding portion is smaller than that of the terminal accommodating portion. According to this configuration, the interference of the front end part of the shield terminal with an opening edge part at the rear end of the terminal accommodating portion can be avoided in the process of inserting the front end part of the shield terminal into the terminal accommodating portion from behind the housing.

(3) Preferably, in (2), a tapered guiding surface is formed on an inner surface of a rear end part of the tubular holding portion. According to this configuration, the front end part of the shield terminal can be prevented from being caught by the rear end part of the tubular holding portion when the front end part of the shield terminal enters the tubular holding portion.

(4) Preferably, the outer conductor is fit into the tubular holding portion, and a front end of the outer conductor is located at the same position as that of the tubular holding portion or behind that of the tubular holding portion in a front-rear direction. According to this configuration, a tubular fitting portion of a mating connector can be prevented from being scratched by the outer conductor when the tubular fitting portion is fit into the receptacle.

DETAILS OF EMBODIMENT OF PRESENT DISCLOSURE

Embodiment

Figure 1:
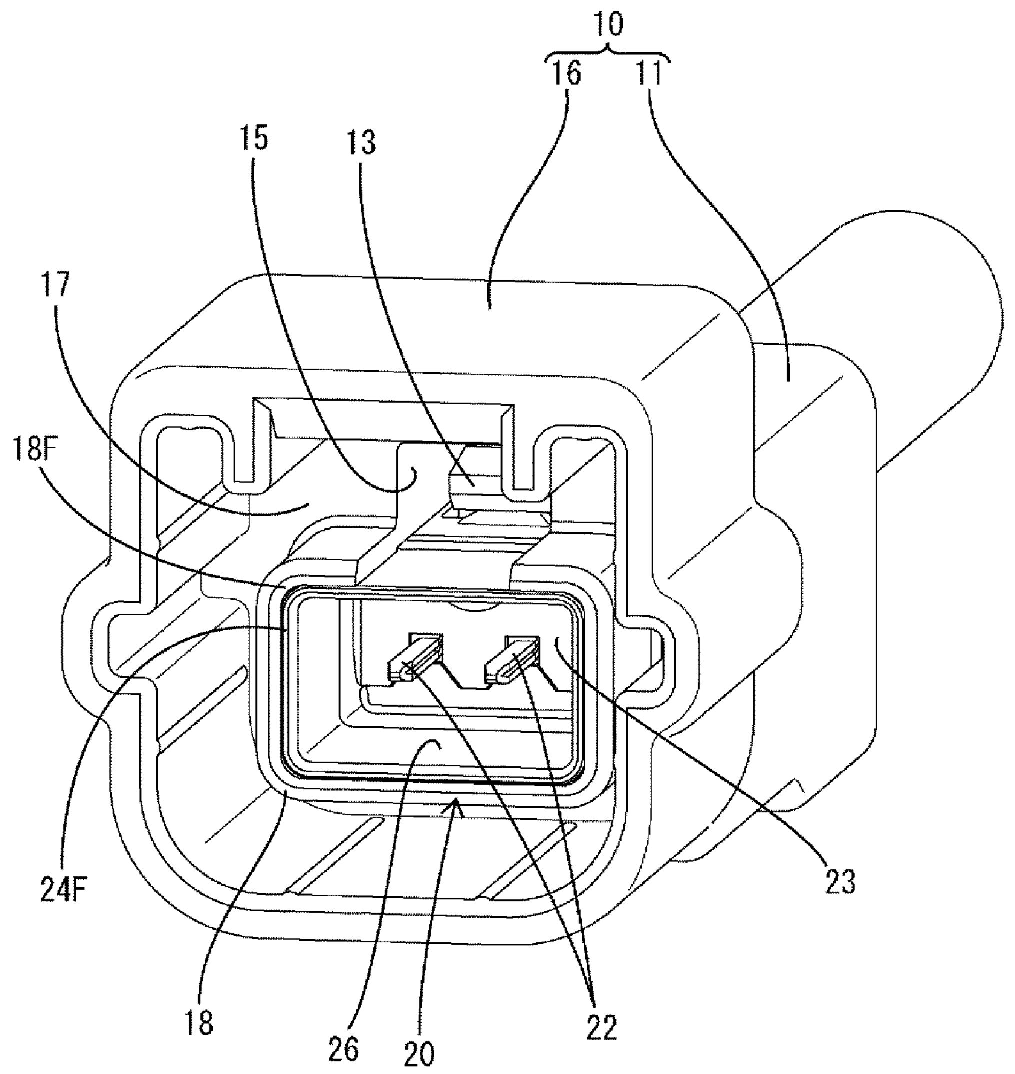
FIG. 1 is a perspective view of a shield connector of one embodiment.
Figure 2:
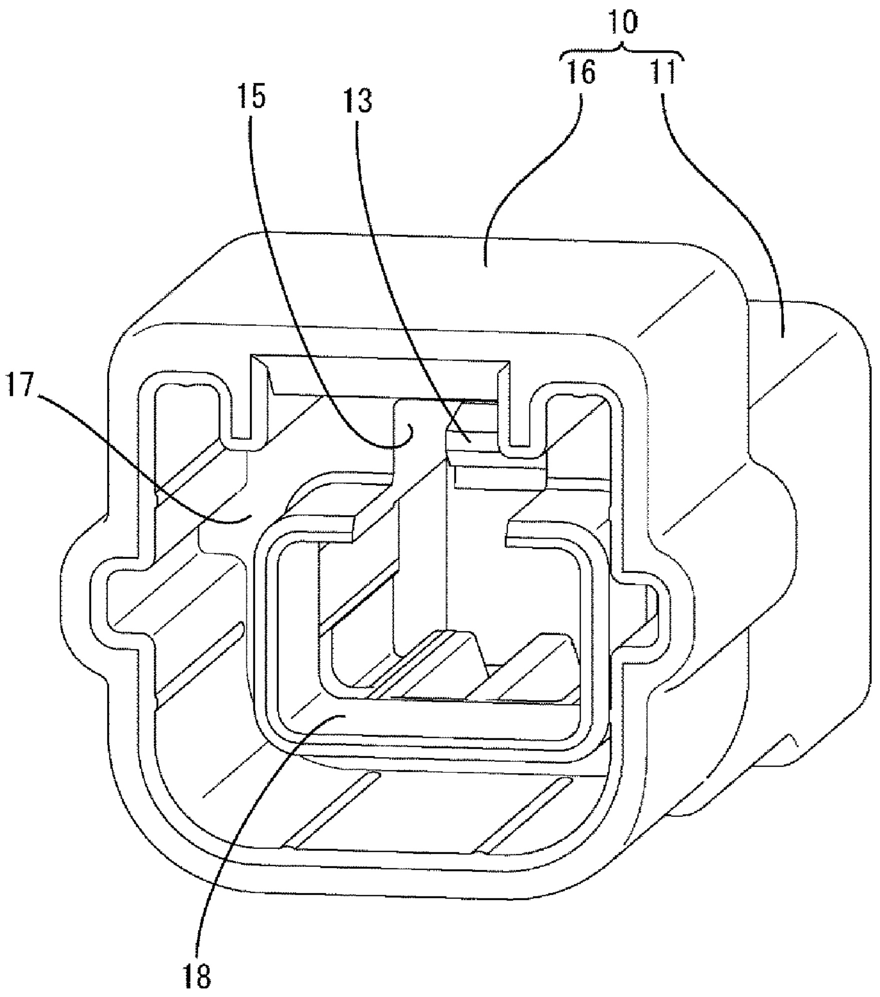
FIG. 2 is a perspective view of a housing.
Figure 3:
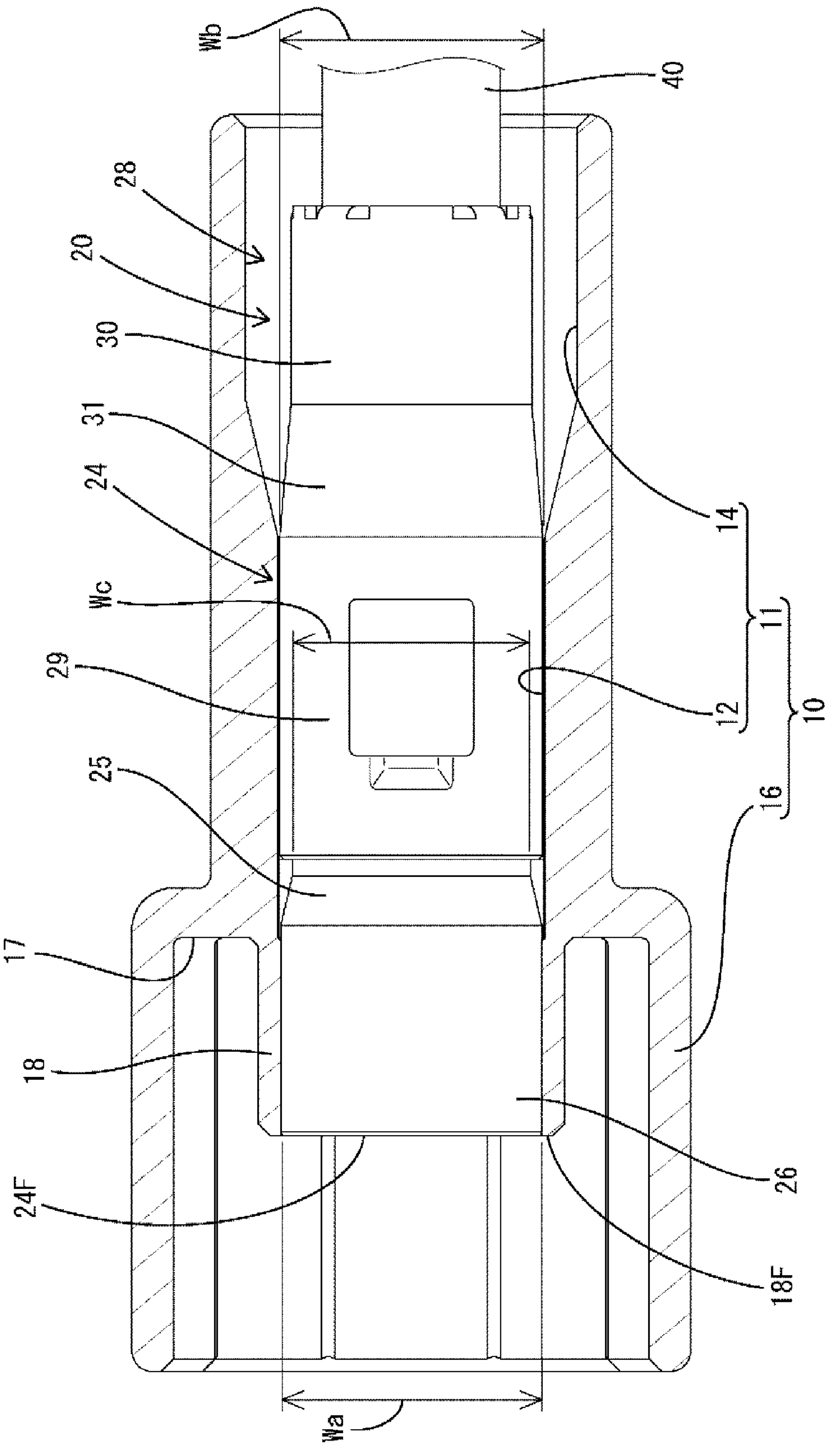
FIG. 3 is a plan view in section of the shield connector.
Figure 4:
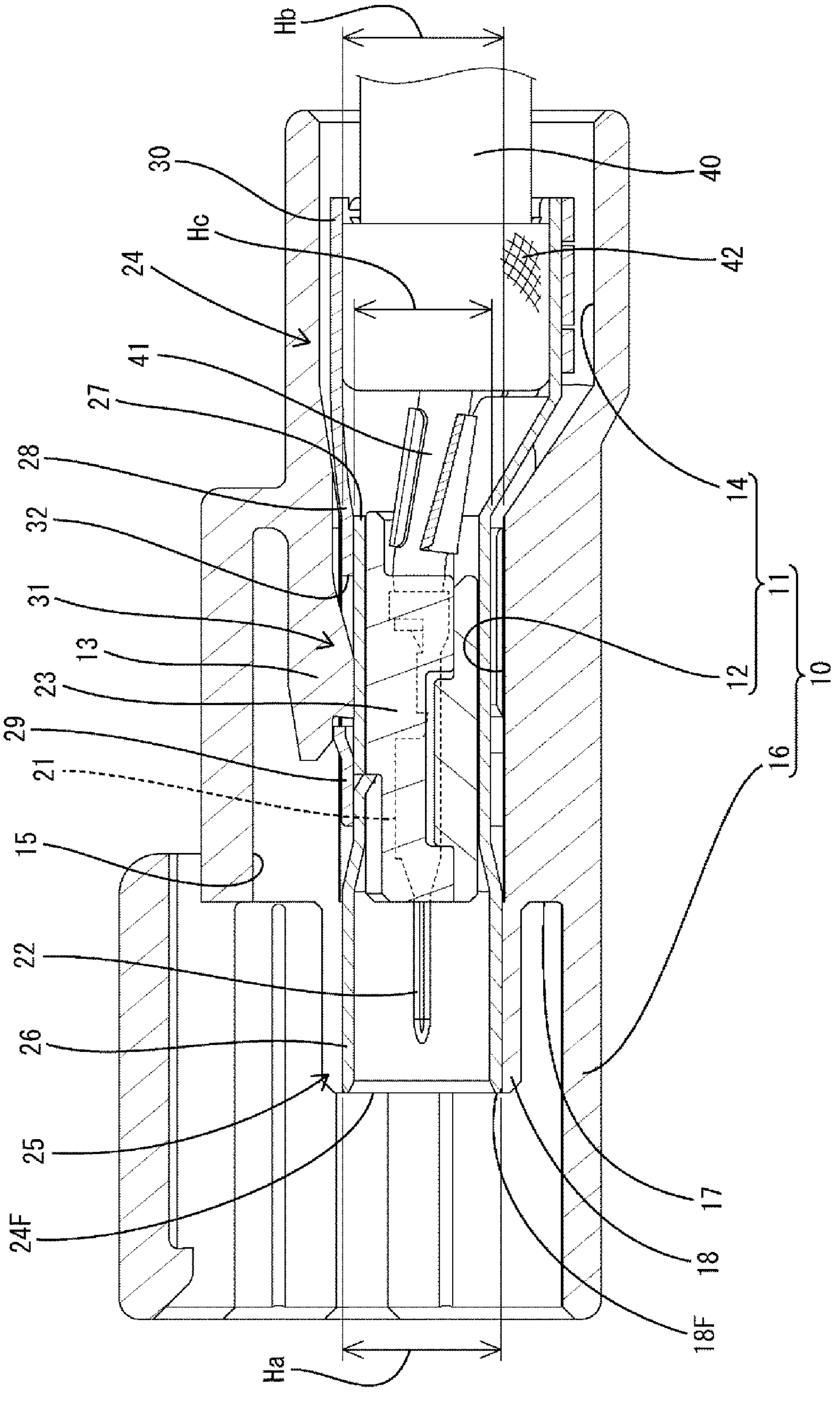
FIG. 4 is a side view in section of the shield connector.
Figure 5:
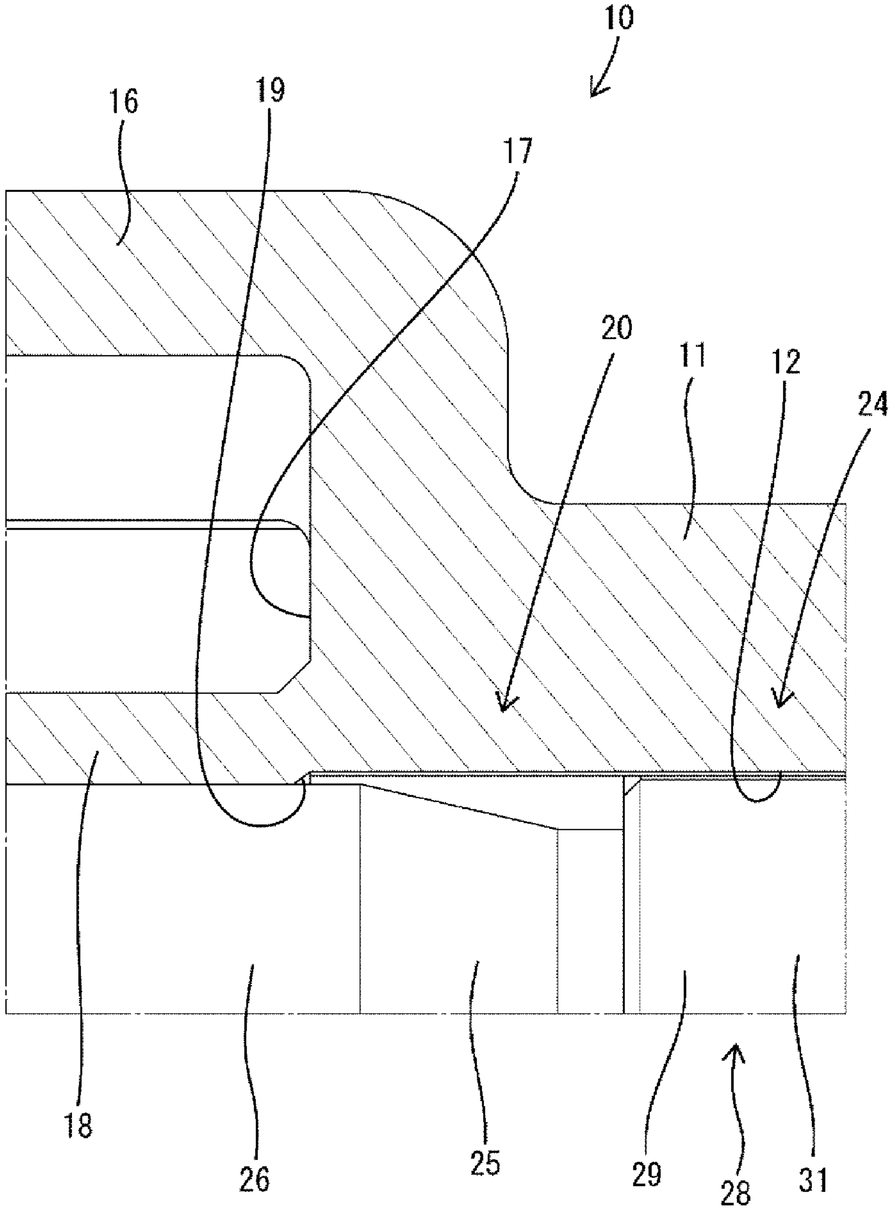
FIG. 5 is a partial enlarged plan view in section of FIG. 3.

One specific embodiment of a shield connector of the present disclosure is described with reference to FIGS. 1 to 5. Note that the present invention is not limited to these illustrations, but is represented by claims and intended to include all changes in the scope of claims and in the meaning and scope of equivalents. In this embodiment, a left side in FIGS. 3 to 5 is defined as a front side concerning a front-rear direction. Upper and lower sides shown in FIGS. 1, 2 and 4 are directly defined as upper and lower sides concerning a vertical direction. Upper and lower sides shown in FIG. 3 are defined as left and right sides concerning a lateral direction.

The shield connector of the present disclosure is configured by assembling a housing 10 made of synthetic resin and a shield terminal 20. The housing 10 is a single component having a tubular shape hollow in the front-rear direction as a whole and including, as shown in FIGS. 1 to 4, a terminal accommodating portion 11 and a receptacle 16 connected to the front end of the terminal accommodating portion 11.

As shown in FIGS. 3 and 4, the terminal accommodating portion 11 includes a first accommodation chamber 12 constituting a front end side part of the terminal accommodating portion 11 and a second accommodation chamber 14 constituting a rear end side part of the terminal accommodating portion 11. As shown in FIG. 4, an upper wall portion constituting the first accommodation chamber 12 is formed with a locking lance 13 resiliently displaceable in the vertical direction. A resilient displacement direction of the locking lance 13 is a direction intersecting a mounting direction of the shield terminal 20 into the housing 10. A height of the second accommodation chamber 14 is larger than that of the first accommodation chamber 12. A width of the second accommodation chamber 14 is larger than that of the first accommodation chamber 12. The terminal accommodating portion 11 includes a mold removal space 15 formed when the locking lance 13 is formed by a mold (not shown). The mold removal space 15 communicates with the upper surface of the first accommodation chamber 12 and is open in the front surface of the terminal accommodating portion 11.

The receptacle 16 is in the form of a rectangular tube cantilevered forward from an outer peripheral part of the front end of the terminal accommodating portion 11. A height of the receptacle 16 is larger than that of the first accommodation chamber 12. A width of the receptacle 16 is larger than that of the first accommodation chamber 12. A back end surface 17 of the receptacle 16 is formed to surround an opening at the front end of the first accommodation chamber 12 (terminal accommodating portion 11) in a front view of the housing 10. The mold removal space 15 is open in the back end surface 17 of the receptacle 16. The mold removal space 15 is open at a position in a laterally central part of an upper edge on the opening edge of the first accommodation chamber 12.

As shown in FIGS. 1 to 5, the housing 10 is formed with a tubular holding portion 18 for holding a front part (tubular connecting portion 26) of the shield terminal 20. The tubular holding portion 18 is cantilevered forward from the opening edge of the first accommodation chamber 12 in the back end surface 17 of the receptacle 16. In a state accommodated in the receptacle 16, the tubular holding portion 18 is formed integrally with the terminal accommodating portion 11. The opening edge of the first accommodation chamber 12 is interrupted in the laterally central part of the upper edge and communicates with the mold removal space 15. Thus, a formation range of the tubular holding portion 18 in the front view is an entire region of the lower edge, entire regions of both left and right side edges and both left and right end parts of the upper edge, out of the opening edge of the first accommodation chamber 12. The tubular holding portion 18 is not formed in the laterally central part of the upper edge.

A width Wa in the lateral direction of the tubular holding portion 18 is constant over an entire length from the front end to the rear end of the tubular holding portion 18. As shown in FIG. 3, the width Wa of the tubular holding portion 18 is slightly smaller than a width Wb of the first accommodation chamber 12, and equal to a width Wa of the tubular connecting portion 26 of an outer conductor 24 to be described later. A height Ha in the vertical direction of the tubular holding portion 18 is also constant over the entire length from the front end to the rear end of the tubular holding portion 18. The height Ha of the tubular holding portion 18 is slightly smaller than a height Hb of the first accommodation chamber 12 and equal to a height Ha of the tubular connecting portion 26 of the outer conductor 24.

As described above, the inner dimensions Wa, Ha of the tubular holding portion 18 are different from the inner dimensions Wb, Hb of the first accommodation chamber 12. Due to this dimensional differences, a tapered guiding surface 19 is formed between a rear end part of the inner peripheral surface of the tubular holding portion 18 and a front end part of the inner peripheral surface of the first accommodation chamber 12. A height of the guiding surface 19 gradually decreases toward the front. A width of the guiding surface 19 also gradually decreases toward the front.

As shown in FIGS. 1 and 4, the shield terminal 20 is provided with a pair of left and right inner conductors 21 made of metal, a dielectric 23 made of synthetic resin and the outer conductor 24. The pair of inner conductors 21 are accommodated in the dielectric 23. The outer conductor 24 surrounds the inner conductors 21 and the dielectric 23. The pair of left and right inner conductors 21 are connected to front end parts of twisted pair wires 41 constituting a shielded cable 40.

The outer conductor 24 is configured by assembling an inner shell 25 made of metal and in the form of a rectangular tube and an outer shell 28 made of metal and separate from the inner shell 25. The inner shell 25 is a single component including the tubular connecting portion 26 constituting a front end side part of the inner shell 25 and a tubular accommodating portion 27 constituting a rear end side part of the inner shell 25. The height Ha in the vertical direction of the tubular connecting portion 26 is larger than a height Hc of the tubular accommodating portion 27. The width Wa in the lateral direction of the tubular connecting portion 26 is larger than a width Wc of the tubular accommodating portion 27. The dielectric 23 is accommodated in the tubular accommodating portion 27. Tabs 22 at the front ends of the inner conductors 21 project from the front surface of the dielectric 23 and are surrounded by the tubular connecting portion 26.

The outer shell 28 has a box shape open in both front and rear end surfaces. The outer shell 28 is a single component including an external fitting portion 29 constituting a front end side part of the outer shell 28 and a crimping portion 30 constituting a rear end side part of the outer shell 28. The outer shell 28 surrounds a part of the inner shell 25. The external fitting portion 29 is fixed to the tubular accommodating portion 27 of the inner shell 25 while being externally fit to the tubular accommodating portion 27. The tubular connecting portion 26 of the inner shell 25 projects further forward than the front end of the outer shell 28. A height Ha of the external fitting portion 29 and the height Ha of the tubular connecting portion 26 are set to be equal. A width Wa of the external fitting portion 29 and the width Wa of the tubular connecting portion 26 are set to be equal. The crimping portion 30 of the outer shell 28 is conductively fixed to a shield layer 42 on the outer peripheral surface of the shielded cable 40.

A front end side region of the shield terminal 20 is constituted by the tubular connecting portion 26 of the inner shell 25. That is, the tubular connecting portion 26 constitutes a front end part of the shield terminal 20 while constituting the front end side part of the inner shell 25 at the same time. A rear end side region of the shield terminal 20 functions as a terminal body portion 31. The terminal body portion 31 is composed of parts of the inner conductors 21 behind the tabs 22, the dielectric 23, the outer shell 28 and the tubular accommodating portion 27. A locking recess 32 to be locked to the locking lance 13 is formed in the outer surface of the terminal body portion 31.

The height Ha of the tubular connecting portion 26 of the shield terminal 20 and a height Ha of the terminal body portion 31 are set to be equal. The height Ha of the tubular connecting portion 26 is equal to a height Ha of the tubular holding portion 18 of the housing 10. The width Wa of the tubular connecting portion 26 and a width Wa of the terminal body portion 31 are set to be equal. The width Wa of the tubular connecting portion 26 is equal to a width Wa of the tubular holding portion 18.

The shield terminal 20 is mounted into the housing 10 by being inserted into the terminal accommodating portion 11 from behind the housing 10. In the process of inserting the shield terminal 20, the locking lance 13 is resiliently displaced upward by interference with the upper surface of the outer conductor 24. If the shield terminal 20 reaches a predetermined insertion position, the resiliently returned locking lance 13 is locked into the locking recess 32, whereby the shield terminal 20 is retained and held in the housing 10.

In the process of inserting the shield terminal 20, the tubular connecting portion 26 moves from the first accommodation chamber 12 to the tubular holding portion 18 having smaller inner dimensions than the first accommodation chamber 12. Thus, a front end part of the tubular connecting portion 26 may be caught by a rear end part of the tubular holding portion 18, but the tapered guiding surface 19 is formed between a front end part of the first accommodation chamber 12 and a rear end part of the tubular connecting portion 26 as a countermeasure against that. The front end part of the tubular connecting portion 26 can enter the tubular holding portion 18 from the first accommodation chamber 12 without being caught by the rear end part of the tubular holding portion 18 by sliding in contact with the guiding surface 19.

A height Ha of the outer surface of the tubular connecting portion 16 is equal to a height Ha of the inner surface of the tubular holding portion 18. A width Wa of outer side surfaces of the tubular connecting portion 26 is equal to a width Wa of inner side surfaces of the tubular holding portion 18. Accordingly, with the tubular connecting portion 26 located in the tubular holding portion 18, the outer peripheral surface of the tubular connecting portion 26 is held in surface contact with the inner peripheral surface of the tubular holding portion 18. In this way, the tubular connecting portion 26 does not rattle in the vertical direction and lateral direction in the tubular holding portion 18.

The shield connector of this embodiment is provided with the shield terminal 20 and the housing 10 for accommodating the shield terminal 20. The housing 10 includes the receptacle 16. The receptacle 16 surrounds the tubular connecting portion 26 in the front end part of the shield terminal 20 while being spaced apart therefrom. The housing 10 is formed with the tubular holding portion 18. The tubular holding portion 18 holds an outer peripheral part of the front end part (tubular connecting portion 26) of the shield terminal 20 in the receptacle 16. Since the tubular holding portion 18 of the housing 10 holds the front end part of the shield terminal 20, the rattling of the shield terminal 20 in the housing 10 can be prevented.

The terminal accommodating portion 11 is formed behind the receptacle 16 in the housing 10. The shield terminal 20 includes the terminal body portion 31 to be accommodated into the first accommodation chamber 12 of the terminal accommodating portion 11. The width Wa of the tubular connecting portion 26 of the shield terminal 20 and the width Wa of the terminal body portion 31 are equal. The width Wa of the tubular holding portion 18 is smaller than the width Wb of the first accommodation chamber 12 of the terminal accommodating portion 11. According to this configuration, the interference of the front end part of the shield terminal 20 with the opening edge part at the rear end of the terminal accommodating portion 11 can be avoided in the process of inserting the front end part of the shield terminal 20 into the terminal accommodating portion 11 from behind the housing 10.

Since the tapered guiding surface 19 is formed on the inner surface of the rear end part of the tubular holding portion 18, the tubular connecting portion 26 can be prevented from being caught by the rear end part of the tubular holding portion 18 when the front end part of the shield terminal 20 enters the tubular holding portion 18.

The tubular connecting portion 26 of the outer conductor 24 is fit into the tubular holding portion 18. A front end 24F of the tubular connecting portion 26 of the outer conductor 24 is arranged at the same position as a front end 18F of the tubular holding portion 18 in the front-rear direction. According to this configuration, a tubular fitting portion of a mating connector (not shown) can be prevented from being scratched by the outer conductor 24 when the tubular fitting portion is fit into the receptacle 16.

Other Embodiments

The present invention is not limited to the above described and illustrated embodiment, but is represented by claims. The present invention is intended to include all changes in the scope of claims and in the meaning and scope of equivalents and also include the following embodiments.

Although the width of the tubular holding portion is smaller than that of the terminal accommodating portion in the above embodiment, the width of the tubular holding portion may be equal to that of the terminal accommodating portion.

Although the guiding surface is formed on the inner surface of the rear end part of the tubular holding portion in the above embodiment, the guiding surface may not be formed on the inner surface of the rear end part of the tubular holding portion.

Although the front end of the outer conductor is arranged at the same position as the front end of the tubular holding portion in the front-rear direction in the above embodiment, the front end of the outer conductor in the front-rear direction may be located behind or in front of the front end of the tubular holding portion.

LIST OF REFERENCE NUMERALS

10 . . . housing
11 . . . terminal accommodating portion
12 . . . first accommodation chamber
13 . . . locking lance
14 . . . second accommodation chamber
15 . . . mold removal space
16 . . . receptacle

17 . . . back end surface
18 . . . tubular holding portion
18F . . . front end of tubular holding portion
19 . . . guiding surface
20 . . . shield terminal
21 . . . inner conductor
22 . . . tab
23 . . . dielectric
24 . . . outer conductor
24F . . . front end of outer conductor
25 . . . inner shell
26 . . . tubular connecting portion (front end part of outer conductor)
27 . . . tubular accommodating portion
28 . . . outer shell
29 . . . external fitting portion
30 . . . crimping portion
31 . . . terminal body portion
32 . . . locking recess
40 . . . shielded cable
41 . . . twisted pair wire
42 . . . shield layer
Ha . . . height of tubular holding portion, height of tubular connecting portion, height of external fitting portion, height of terminal body portion
Hb . . . height
Hc . . . height of tubular accommodating portion
Wa . . . width of tubular holding portion, width of tubular connecting portion, width of external fitting portion, width of terminal body portion
Wb . . . width of first accommodation chamber
Wc . . . width of tubular accommodating portion

What is claimed is:

1. A shield connector, comprising:

a shield terminal including an inner conductor, a dielectric and an outer conductor, the inner conductor and the dielectric being surrounded by the outer conductor;

a tab disposed at a front end of the inner conductor, the tab projecting from a front surface of the dielectric and being surrounded by a tubular connecting portion of the outer conductor, the tubular connecting portion being made of metal and constituting a front end part of the shield terminal; and a housing for accommodating the shield terminal, the shield terminal being mountable into the housing, the housing including a receptacle being spaced apart from and surrounding the front end part of the shield terminal, and a tubular holding portion for holding an outer peripheral part of the front end part of the shield terminal in the receptacle, by an inner peripheral surface of the tubular holding portion being held against an outer peripheral part of the tubular connecting portion.

2. The shield connector of claim 1, wherein:

the housing further includes a terminal accommodating portion formed behind the receptacle, the shield terminal further includes a terminal body portion to be accommodated into the terminal accommodating portion, a width of the front end part of the shield terminal and that of the terminal body portion are equal, and a width of the tubular holding portion is smaller than that of the terminal accommodating portion.

3. The shield connector of claim 2, wherein a tapered guiding surface is formed on an inner surface of a rear end part of the tubular holding portion.

4. The shield connector of claim 1, wherein:

the outer conductor is fit into the tubular holding portion, and a front end of the outer conductor is located at the same position as a front end of the tubular holding portion in a front-rear direction.

5. The shield connector of claim 1, wherein:

the outer conductor is fit into the tubular holding portion, and a front end of the outer conductor is located behind a front end of the tubular holding portion in a front-rear direction, the tubular fitting portion configured to prevent scratching of a tubular fitting portion of a mating connector by the outer conductor.

6. The shield connector of claim 1, wherein:

the housing further includes a terminal accommodating portion formed behind the receptacle, a width of the tubular holding portion is smaller than a width of the terminal accommodating portion, and a guiding surface is formed on an inner surface of a rear end part of the tubular holding portion, the guiding surface extending from the inner peripheral surface of the tubular holding portion to an inner peripheral surface of the terminal accommodating portion and having a height that gradually decreases toward the front in a front-rear direction.

7. The shield connector of claim 6, wherein the guiding surface is configured to guide a front end part of the tubular connecting portion into the terminal holding portion by sliding the front end part of the tubular connecting portion while in contact with the guiding surface.

8. The shield connector of claim 3, wherein the tapered guiding surface is configured to guide a front end part of the tubular connecting portion into the terminal holding portion by sliding the front end part of the tubular connecting portion while in contact with the tapered guiding surface.

* * * * *